(12) United States Patent
Hoheisel

(10) Patent No.: US 10,371,713 B2
(45) Date of Patent: Aug. 6, 2019

(54) MEASUREMENT OF THE FLOW VELOCITY AND THE FLOW DIRECTION OF GASES AND LIQUIDS

(71) Applicant: MRP Properties LLC, Arlington, VA (US)

(72) Inventor: Raymond Hoheisel, Arlington, VA (US)

(73) Assignee: MRP Properties LLC, Arlington, VA (US)

( * ) Notice: Subject to any disclaimer, the term of this patent is extended or adjusted under 35 U.S.C. 154(b) by 102 days.

(21) Appl. No.: 15/615,141

(22) Filed: Jun. 6, 2017

(65) Prior Publication Data

US 2017/0350915 A1    Dec. 7, 2017

Related U.S. Application Data

(60) Provisional application No. 62/346,758, filed on Jun. 7, 2016.

(51) Int. Cl.
*G01P 5/00*   (2006.01)
*G01F 1/36*   (2006.01)
*G01F 1/712*  (2006.01)
*G01P 5/14*   (2006.01)
*G01P 13/04*  (2006.01)
*G01F 1/704*  (2006.01)

(52) U.S. Cl.
CPC ............... *G01P 5/001* (2013.01); *G01F 1/36* (2013.01); *G01F 1/712* (2013.01); *G01P 5/14* (2013.01); *G01P 13/045* (2013.01); *G01F 1/704* (2013.01)

(58) Field of Classification Search
CPC ..... G01P 5/001; G01P 13/045; G01P 5/14-24; G01F 1/36; G01F 1/712; G01F 1/704
USPC .. 73/1.16, 1.29, 1.34, 1.35, 1.37-1.39, 1.57, 73/1.59-1.62, 1.75-1.78, 178 R, 73/170.01-170.28, 861.351, 73/861.42-861.69, 152.43-152.53; 702/2, 702/3, 85, 92, 93, 96, 98, 104, 127
See application file for complete search history.

(56) References Cited

U.S. PATENT DOCUMENTS

| | | | | |
|---|---|---|---|---|
| 2012/0125077 A1* | 5/2012 | Rodney | ................. | E21B 47/022 73/1.37 |
| 2014/0352400 A1* | 12/2014 | Barrilado | ................ | B81B 7/008 73/1.38 |
| 2015/0014058 A1* | 1/2015 | Wassell | ................... | E21B 44/00 175/48 |

(Continued)

*Primary Examiner* — Robert R Raevis
(74) *Attorney, Agent, or Firm* — Banner & Witcoff, Ltd.

(57) ABSTRACT

Apparatuses, systems, and methods are provided for measuring the velocity and direction of a fluid flow. In some instances, a measuring system may include a housing capable of holding one or more pressure sensors in a desired location and orientation. The housing may include a cavity for each of the one or more pressure sensors and each cavity may have a connection to an opening at the outside surface of housing. Each opening may be able to face in any desired direction such that the pressure at any desired location on the outside surface of housing, which may be capable of facing in any desired direction, may extend to the cavity inside housing where it can be measured by a pressure sensor. The velocity and the direction of a fluid flow around the housing of the measurement system may be based on pressure readings generated by the pressure sensors.

20 Claims, 12 Drawing Sheets

(56) References Cited

U.S. PATENT DOCUMENTS

2018/0279915 A1\* 10/2018 Huang .................. A61B 5/002

\* cited by examiner

MEASUREMENT OF THE FLOW VELOCITY AND THE FLOW DIRECTION OF GASES AND LIQUIDS

CROSS REFERENCE TO RELATED APPLICATIONS

This application claims priority to provisional U.S. Application Ser. No. 62/346,758, filed Jun. 7, 2016, entitled, "Measurement of the flow velocity and the flow direction of gases and liquids," herein incorporated by reference for all purposes.

FIELD

Aspects described herein are generally related to measuring the velocity and direction of a fluid flow. More specifically, aspects of the disclosure relate to apparatuses, systems, and methods for measuring the velocity and direction of gases and liquids.

BACKGROUND

The accurate, precise, and reliable measurement of the velocity and direction of the flow of fluids such as gases and liquids is of great importance. For example, in meteorology, the speed and direction of wind (e.g., the flow of ambient air), are important parameters for the classification, forecast, and research of weather and climate conditions. In industrial applications, the measurement of the flow velocity and direction of fluids is imperative for system control and monitoring, as well as for the determination of trade quantities.

However, the measurement of the velocity and direction of fluid flows can be challenging. Current meters for flow velocity and flow direction of gases and liquids are usually limited by the fact that either (a) two separate instruments for flow speed and flow direction are required resulting in increased complexity and cost and/or (b) single instrument measuring devices are restricted by high power consumption, complexity, large dimensions, and/or reduced resilience with regard to external factors such as animal interaction, dust, icing, hail, and/or other factors.

In the case of measuring the velocity and direction of wind flow, rotating wind speed meters, such as cup anemometers, generally measure wind speed, but not wind direction. Further, cup anemometers require extensive and frequent calibration and are prone to mechanical failure due to moving and/or rotating parts. Sonic anemometers, which can measure both wind speed and direction, have limited operational stand-alone lifetime due to high power consumption. In addition, high volume requirements of sonic anemometers, as needed for multiple sonic paths, further reduce usability in applications where limited space for installation and transport is required.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure address one or more of the issues mentioned above by disclosing apparatuses, systems, and methods that allow for allow the measurement of the velocity and direction of gases and liquids, including but not limited to the measurement of wind velocity and direction, in a single instrument which features low volume, low power consumption, high accuracy, low cost, ease of installation/operation and resilience against other environmental conditions, including but not limited to rain, hail, icing, dust, noise, animal interaction and mechanical vibrations.

According to a first illustrative aspect, a housing is provided that may include several openings facing in different and/or opposing directions which are each connected to a separate cavity inside the housing where a pressure sensor measures and records the pressure inside each cavity.

In another illustrative aspect, an additional pressure sensor and/or one or more environmental sensors, such as a temperature sensor, a humidity sensor, a global positioning system (GPS, Galileo), a magnetometer and/or an accelerometer sensor, are placed outside of the housing to measure ambient pressure, temperature, humidity as well as location, orientation and inclination of the housing.

In another illustrative aspect, a non-transitory computer readable medium has stored therein instructions that are executable by a computing device to cause the computing device to perform functions comprising operating a measurement system that may include pressure sensors, other environmental sensors such as a temperature sensor, a humidity sensor, a GPS receiver, a magnetometer, an accelerometer and/or an orientation sensor, and that is configured to read the pressure value of one or more pressure or environmental sensors in order to calculate the incident direction and velocity of the flow of a gas or liquid around the housing.

The system allows the measurement of the flow velocity and flow direction of gases and liquids including, but not limited to, wind (e.g., ambient air), in industrial applications, as well as in the control and monitoring of residential heating/cooling applications.

These and other aspects, advantages, and alternatives, will become apparent upon reading the following detailed description, with reference where appropriate to the accompanying drawings.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
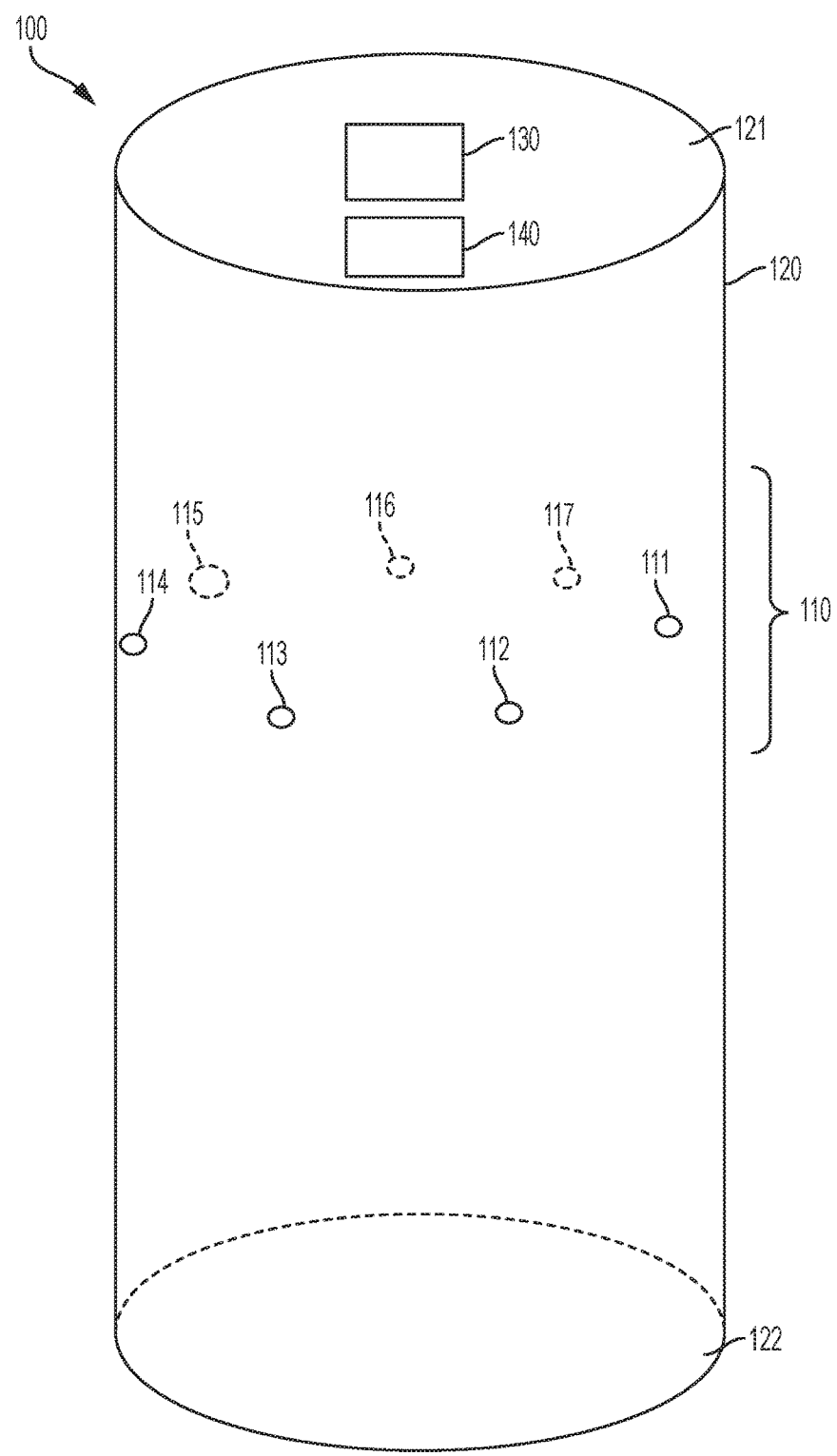
FIG. 1 illustrates a schematic diagram of a first embodiment of a flow velocity and direction measurement system according to one or more illustrative aspects described herein.

FIG. 1 illustrates a schematic diagram of a first embodiment of a flow velocity and direction measurement system 100 according to one or more illustrative aspects described herein. Measurement system 100 may include cylindrical housing 120 with upper lid cover 121, lower lid cover 122, and opening area 110 including one or more openings 111-117. Additionally, measurement system 100 may include processor 130 and memory 140. Processor 130 may be configured to execute computer-readable instructions stored on memory 140, which may cause processor 130 to receive, compute, analyze, and store measurement data corresponding to flow velocity and direction. In some instances, processer 130 may also include and/or be communicatively couple to sensors such as a thermometer, magnetometer, accelerometer, sun intensity sensor, and/or global positioning system (e.g., GPS and/or Galileo) that allow for the determination of location, inclination, and/or orientation of the measurement system.

Measurement system 100 may further include a communication interface which may enable processor 120 of measurement system 100 to communicate readings from one or more of the pressure sensors, thermometer, magnetometer, accelerometer, sun intensity sensor, and/or global positioning system to external computing devices. In some instances, the measurement system 100 may be configured to be controlled, updated, and/or calibrated through communications with an external computing device by way of the communication interface. As such, the communication interface may enable communications over a wide area network (WAN), cellular network, Wi-Fi network, and the like. Additionally and/or alternatively, the communication interface may allow for communications with external computing devices via a Bluetooth connection.

In some instances, measurement system 100 may include a display for presenting information corresponding to the environmental measurements produced by one or more of the pressure sensors, thermometer, magnetometer, accelerometer, sun intensity sensor, and/or global positioning system. In some instances, the display screen may be a touch screen and may be configured to receive user touch input. As such, measurement system 100 may be configured to receive direct user input during calibration and data output. Additionally and/or alternatively, the display screen may not be a touch screen and, instead, the measurement system 100 may receive user inputs and provide outputs through one or more input/output modules such as a button interface, microphone, keypad, and/or stylus through which a user may provide input. Furthermore, the measurement system 100 may also include one or more of a speaker for providing audio input/output.

Measurement system 100 may include a battery which may be communicatively coupled to one or more of processor 130, memory 140, pressure sensors, thermometer, magnetometer, accelerometer, sun intensity sensor, global positioning system, communication interface, and/or input/output interfaces. As such, the battery may be configured to provide power to one or more of such components. In some instances, measurement system 100 may further include an energy generative apparatus such as a solar panel and/or wind turbine, which may be configured to power the battery. Additionally and/or alternatively, one or more of processor 130, memory 140, pressure sensors, thermometer, magnetometer, accelerometer, sun intensity sensor, global positioning system, communication interface, and/or input/output interfaces may include a local battery for powering the respective components.

Through involvement of the various components, measurement system 100 may be configured to perform measurements of the flow velocity and flow direction of fluids such as gases and liquids. As such, measurement system 100 may be used in diverse industrial applications, residential air heating/cooling applications, and for environmental monitoring and recording applications, such as weather stations with wind speed and wind direction measurement capability.

In each of the various applications, housing 120 of measurement system 100 may be configured to be detachably attached to a support apparatus such as a pole, rod, shaft, wall, platform, and the like. In some instances, upper lid cover 121 and/or lower lid cover 122 of housing 120 may include an outer facing cavity which extends into measurement system 100. Any one of a pole, rod, and/or shaft may be configured to be inserted into the outer facing cavity and thereby detachably attach to measurement system 100.

The shape of housing 120 of measurement system 100 may be symmetrical to the axis and/or plane of measurement. For example, as shown in FIG. 1, housing 120 may have the shape of a cylinder, which may be symmetrical along its vertical axis for measurements of the flow velocity and direction along the horizontal axis and/or plane of measurement system 100. Also, different shapes, as shown in FIGS. 6-9, may be used for housing 120. Such shapes may include, but are not limited to, spheres, cones, boxes, rectangular shapes, pentagonal shapes, hexagonal shapes, octagonal shapes, and/or other desired shapes. Housing 120 may have the same number of sides as internal cavities. Additionally and/or alternatively, housing 120 may have a different number of sides than cavities provided there are enough cavity openings around the perimeter to obtain accurate measurements.

The horizontal cross section of measurement system 100 may have dimensions of less than 1 cm and more than 10 cm. The material of housing 120 may be made of weather and corrosion resistant materials, non-magnetic materials, electromagnetic radiation shielding materials, including but not limited to metal, wood, paper, various plastics and/or metal foil, each which may have thicknesses of less than 1 mm and more than 1 cm.

Measurement system 100 may contain the pressure sensors inside of housing 120 so that no critical part(s), such as the pressure sensors or other electronic components, are exposed to the external environment. As such, measurement system 100 may be used in harsh environmental conditions including, but not limited to, rain, hail, snow, icing, dust, animal interaction, corrosive media, and the like. Housing 120, in which the pressure sensors are contained, may have smaller dimensions than traditional measurement systems since moving parts, such as used in cup anemometers or sonic anemometers, are not necessary.

As will be described below, housing 120 may be capable of holding each of the one or more pressure sensors in a desired location and orientation. Housing 120 may be capable of forming a cavity for each of the one or more pressure sensors and each cavity may have a connection to an opening at the outside surface of housing 120. Each opening may be able to face in any desired direction such that the pressure at any desired location on the outside surface of housing 120, which may be capable of facing in any desired direction, may extend to the cavity inside housing 120 where it can be measured by a pressure sensor. By being able to measure the pressure from different openings, and with the openings being constructed to face in any desired direction, the velocity and the direction of the flow of gas or liquid around housing 120 of measurement system 100 can be determined since the flow of a gas or liquid forms a characteristic directional and velocity dependent pressure distribution around housing 120.

Figure 2:
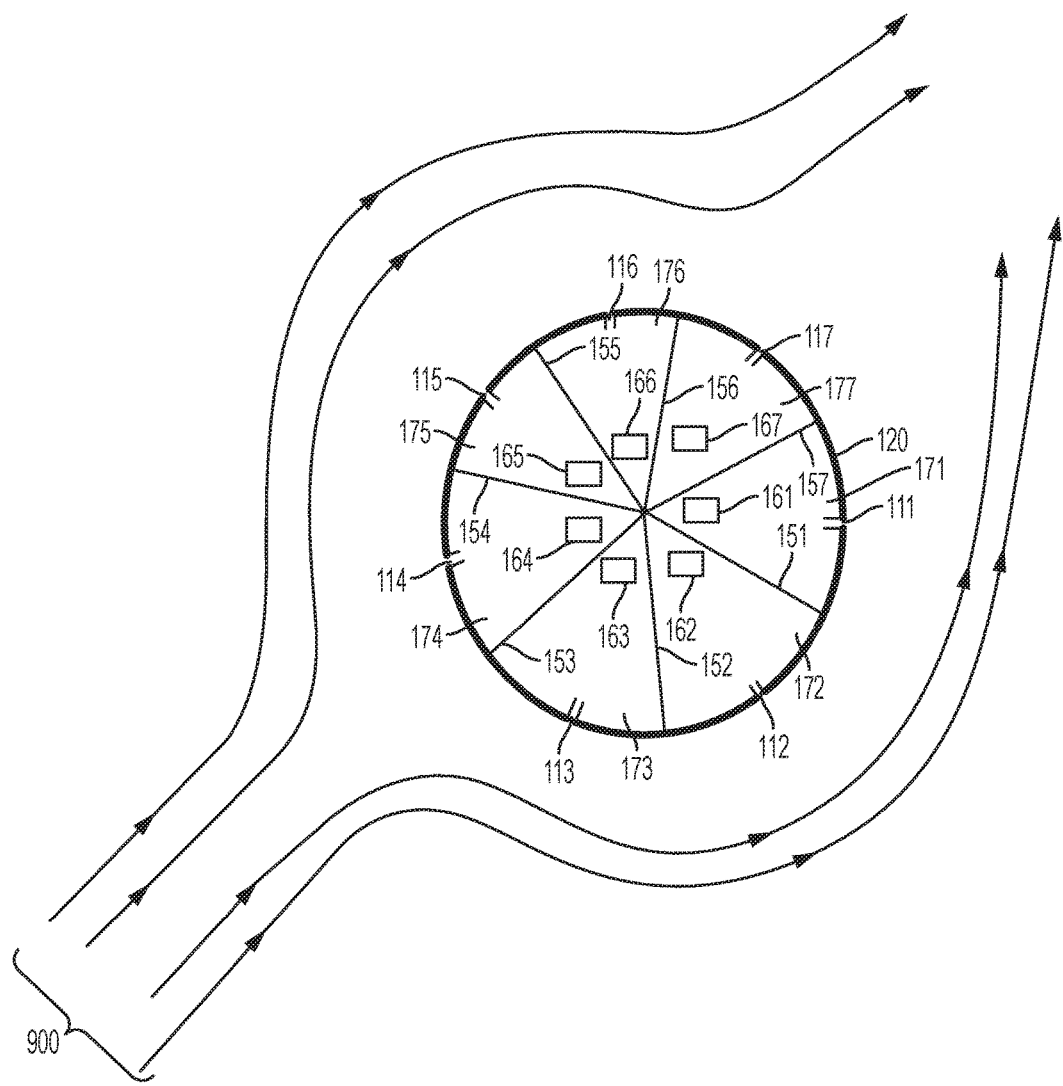
FIG. 2 illustrates a cross-sectional view of the flow velocity and direction measurement system as exposed to a flowing medium (gas and/or liquid) according to one or more illustrative aspects described herein.

For example, FIG. 2 illustrates a cross-sectional view of the flow velocity and direction measurement system 100 as exposed to a flowing medium (gas and/or liquid) according to one or more illustrative aspects described herein. Measurement system 100 may include a housing 120, one or more openings 111-117, one or more walls 151-157 that form one or more separated cavities 171-177 in which one or more pressure sensors 161-167 are positioned. Each of the one or more pressure sensors 161-167 may be configured to measure the pressure of the external environment. For example, a pressure sensor of the one or more pressure sensors 161-167 may be configured to measure the pressure as it extends from the external environment through the associated individual opening corresponding to the cavity in which the particular pressure sensor is located.

For the pressure sensors 161-167, microelectromechanical systems (MEMS) may be used which feature a footprint of only a few cubic millimeters or less. The small dimensions of the pressure sensors 161-167 allows not only for further reduction of the size, weight, and/or dimensions of measurement system 100 but also, due to the low power consumption of MEMS pressure sensors, leads to very low overall system power consumption which permits the described system 100 to be used for standalone applications with operational lifetimes of up to several months, years, or more. As such, in some instances, a plurality of pressure sensors may be included in each cavity.

By using MEMS pressure sensors, high rates of readout of more than 100 readings per second may be achieved and the system 100 can also be ruggedized against mechanical vibrations and temperature variations. Also other pressure sensors, including but not limited to capacitive pressure sensors, membrane pressure sensors, optical pressure sensors and/or mechanical pressure sensors may be used.

The data generated by each of the one or more pressure sensors 161-167 may be utilized by processor 130 of the measurement system 100 to determine the velocity and direction of a fluid flow, such as fluid flow 900. For example, the fluid flow 900 may be a gas and/or liquid flow, and may flow around measurement system 100, which may be of a known/predetermined size and/or shape. The fluid flow 900 may initially contact the southwest quadrant of measurement system 100 at the portions corresponding to openings 113 and 114. The fluid flow 900 may produce a pressure increase and/or decrease permeating openings 113 and 114 into corresponding cavities 173 and 174. Inside cavities 173 and 174, pressure sensors 163 and 164 may detect the pressure produced by fluid flow 900. Such data may be provided to processor 130, which may perform mathematical calculations based on fluid mechanics principles such as Bernoulli's equation and/or numerical and/or analytical fluid dynamic simulations to calculate the velocity of the fluid flow 900. In some instances, processor 130 may utilize the known/predetermined size and/or shape of the measurement system 100 in performing the calculations to determine the velocity of the fluid flow 900. Furthermore, the direction of fluid flow 900 may be determined based upon which of the one or more pressure sensors 161-167 generate pressure readings.

In some instances, each of the openings 111-117 may be manufactured in a particular shape and/or with a recessed and/or extended face that extends from housing 120. For example, the openings may have circular, square, rectangular, and/or other types of geometric shapes. Additionally and/or alternatively, each of the openings 111-117 may be a protruding face that extends outwardly from housing 120. The protruding may fully or partially circumscribe the opening and may have a particular shape. In some instances, the protruding face may have a rectangular shape, semicircle shape, half-oval shape, and the like. In some cases, the openings 111-117 may have a recessed face fully or partially circumscribing the opening. The recessed face may have a may have a rectangular shape, semicircle shape, half-oval shape, and the like. Depending on the environment conditions, the shape of face, as well as the recessed/protruding face may server to increase or decrease the pressure exerted by a fluid flow on the opening and through to the adjacent interior cavity.

Furthermore, the one or more separated cavities 171-177 may be vertically (e.g., longitudinally) stacked in the interior portion of housing 120 of measurement system 100. In doing so, each particular radial sector of the measurement system 100 may be associated with a plurality of cavities and corresponding pressure sensors. As such, greater measurement sophistication of a fluid flow may be achieved by enabling the determination of the pressure corresponding to a fluid flow along a plurality of axes.

Additionally and/or alternatively, the measurement system 100 may be installed in a wind channel for calibration, as will be described in further detail below. After being installed, the measurement system 100 may be exposed to a plurality of fluid flows of varying direction and/or velocity which may be known. The data produced by the various sensors of measurement system 100 may be recorded for each of the plurality of fluid flows. Subsequently, after measurement system 100 is installed in the field, measurement system 100 may be exposed to a plurality of fluid flows of varying direction and/or velocity in the field. The data produced by the various sensors of measurement system 100 corresponding to each of the plurality of fluid flows of varying direction and/or velocity in the field may be compared by processor 130 to the data produced by the various sensors of measurement system 100 for each of the plurality of fluid flows in the wind channel. Based on the comparisons, processor 130 may identify the direction and velocity of each of the fluid flows experienced in the field.

Figure 3A:
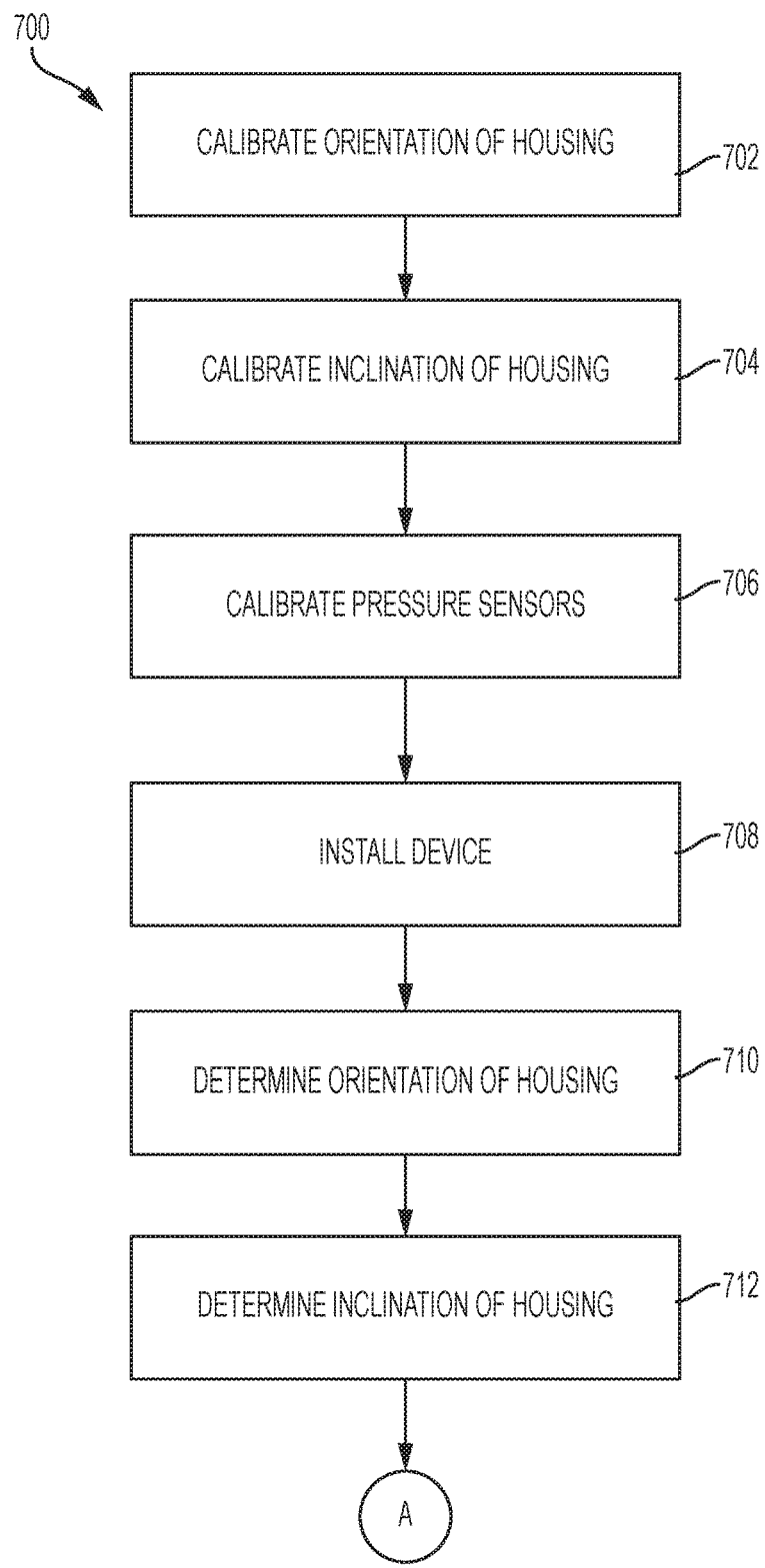
FIGS. 3A and 3B show an illustrative method of calibrating and installing the flow velocity and direction measurement system, as well as for the measurement and calculation of flow speed and direction of a fluid flow, according to one or more illustrative aspects described herein.
Figure 3B:
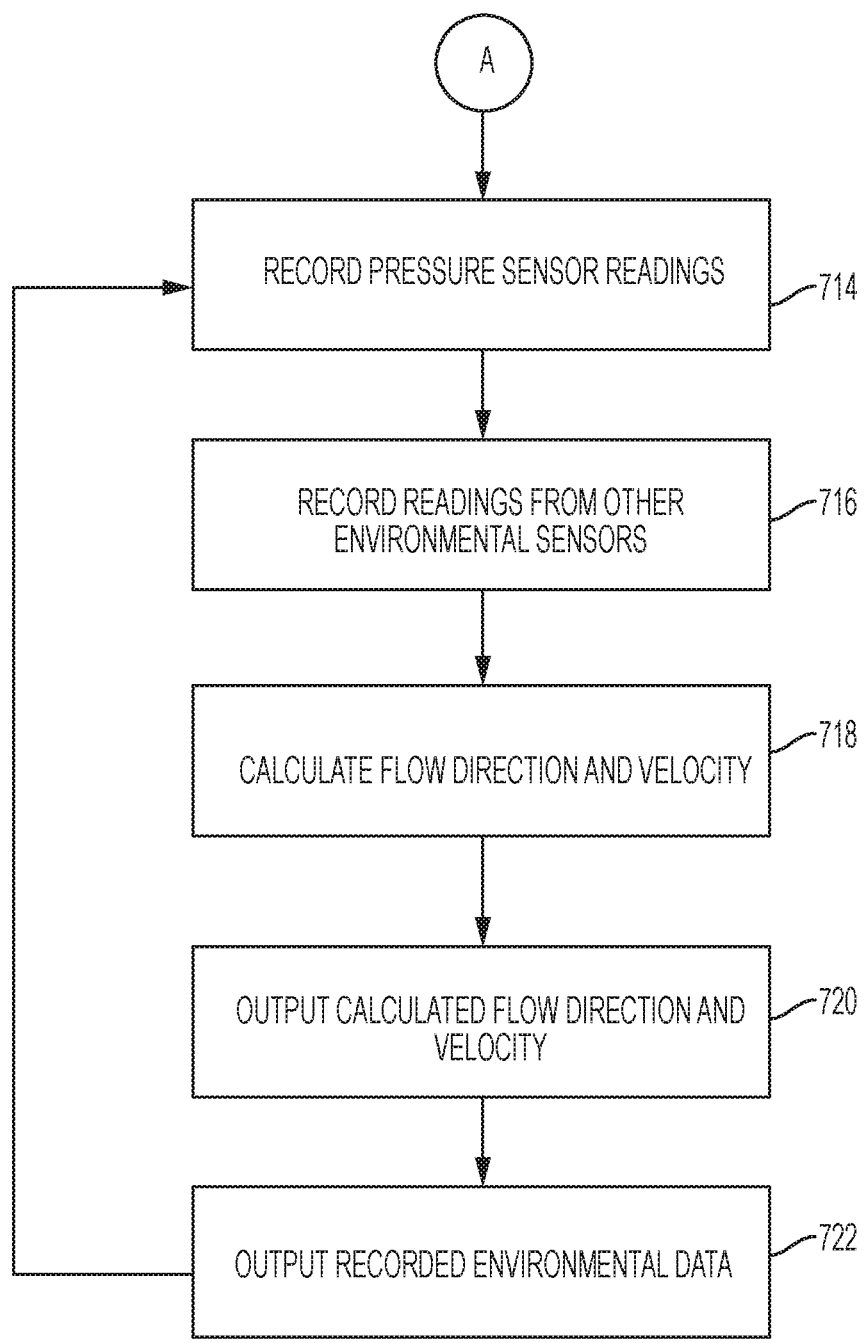

FIGS. 3A and 3B show an illustrative method 700 of calibrating and installing the flow velocity and direction measurement system 100, as well as for the measurement and calculation of flow speed and direction of a fluid flow, according to one or more illustrative aspects described herein.

Referring to FIG. 3A, the method of calibrating and installing the flow velocity and direction measurement system 100 may begin at step 702. At step 702, housing 120 of the measurement system 100 may be oriented north or in any other desired direction in a wind tunnel for calibration purposes. The reading of the magnetometer sensor, which serves as an orientation sensor, may be recorded as a function of orientation by processor 130 and stored in memory 140. At step 704, housing 120 of the measurement system 100 may be inclined at different angles. The reading of the accelerometer sensor, which serves as inclination sensor, may be recorded as a function of inclination angle by processor 130 and stored in memory 140. At step 704, housing 120 may be exposed to a desired range of different flow velocities impinging from different flow directions in relation to measurement system 100. The readings of pressure sensors 161-167 in each cavity may be recorded as a function of flow direction and flow direction by processor 130 and stored in memory 140. In some instances, readings from other environmental sensors, including but not limited to temperature, location, inclination, orientation or humidity, may be recorded by processor 130 and stored in memory 140.

At step 708, the measurement system 100 may be installed in the field. The installation may comprise the positioning of the measurement system 100 in a desired location. At step 710, a determination of the orientation of housing 120 of measurement system 100 may be performed by the processor 130 by reading the magnetometer sensor, which serves as an orientation sensor, and comparing the produced sensor reading to the readings obtained at step 702 and stored in memory 140. In doing so, the orientation of the measurement system 100 may be calibrated. At step 712, the inclination of housing 120 during installation may be determined by processor 130. Hereto, the reading of the accelerometer sensor, which serves as an inclination sensor, may be compared by processor 130 to the recorded readings at step 704 and stored in memory 140. In doing so, the inclination of the measurement system 100 may be calibrated. Such processes may be used in calibrating the sensors of the measurement system 100.

Referring to FIG. 3B, the method 700 method for the measurement and calculation of flow speed and direction of a fluid flow may begin at step 714. At step 714, the effect of the flow velocity and flow direction of a fluid flow around housing 120 of the measurement system 100 may be measured. In particular, the reading of each of the pressure sensors 161-167 from each cavity of cavities 171-177 may be recorded by processor 130 and stored in memory 140. At step 716, the readings from other environmental sensors, including but not limited to temperature, location, inclination, orientation or humidity, may be recorded by processor 130 and stored in memory 140.

At step 718, the flow velocity and flow direction of the fluid flow may be calculated by processor 130. In particular, processor 130 may compare the pressure and/or environmental sensor data measured and stored at steps 714 and 716 with the pressure and/or environmental sensor data measured and stored at step 704. Based on the comparison, processor 130 may be able to determine the flow velocity and flow direction of the fluid flow encountered in the field. At step 720, the processor 130 of the measurement system 100 may output the calculated velocity and direction of the fluid flow. In some instances, the output of the data may include displaying the data on the display device of measurement system 100 and/or transmitting the data through communication interfaces to one or more external computing devices. At step 722, the output of other environmental parameters at determined at 716, such as temperature, location, inclination, orientation, humidity, or other system relevant parameters like power consumption/supply may be performed by processor 130 by displaying the data on the display device of measurement system 100 and/or transmitting the data through communication interfaces to one or more external computing devices. After doing so, the method may return to step 714 and more measurements may be taken.

Figure 4A:
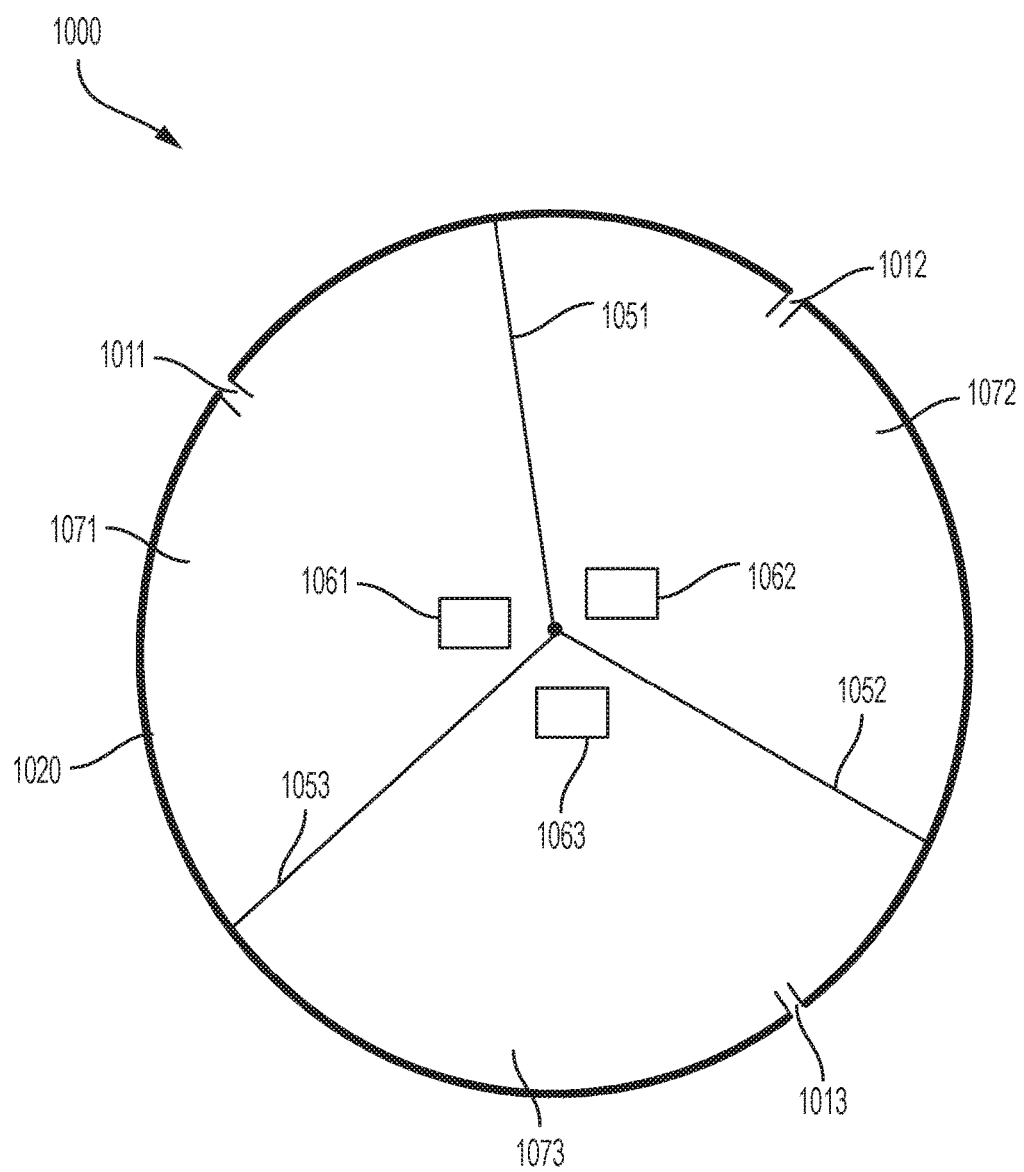
FIGS. 4A, 4B, and 4C illustrate cross-sectional views of the flow velocity and direction measurement system with a varying number of openings, cavities, and pressure sensors according to one or more illustrative aspects described herein.
Figure 4B:
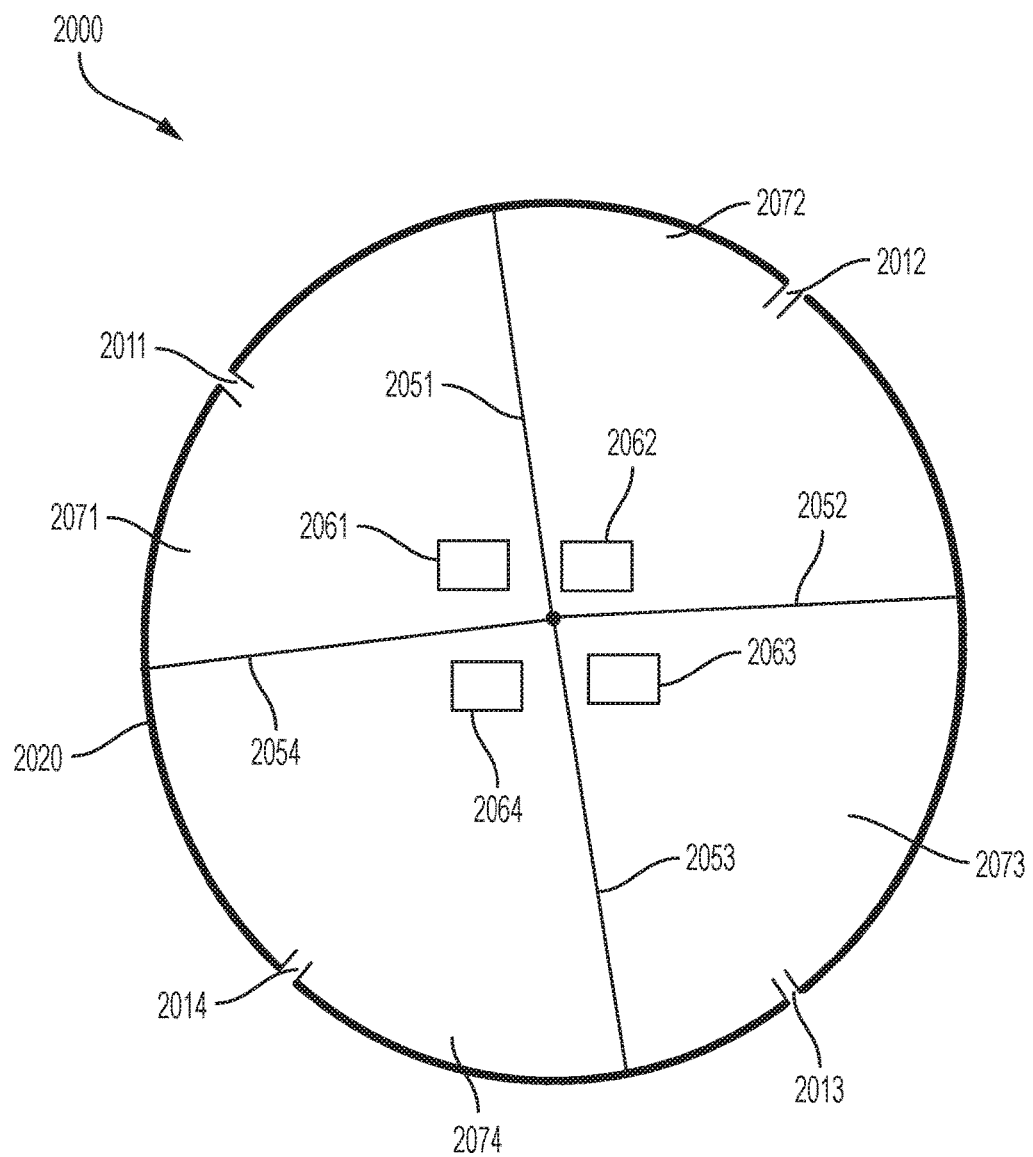
Figure 4C:
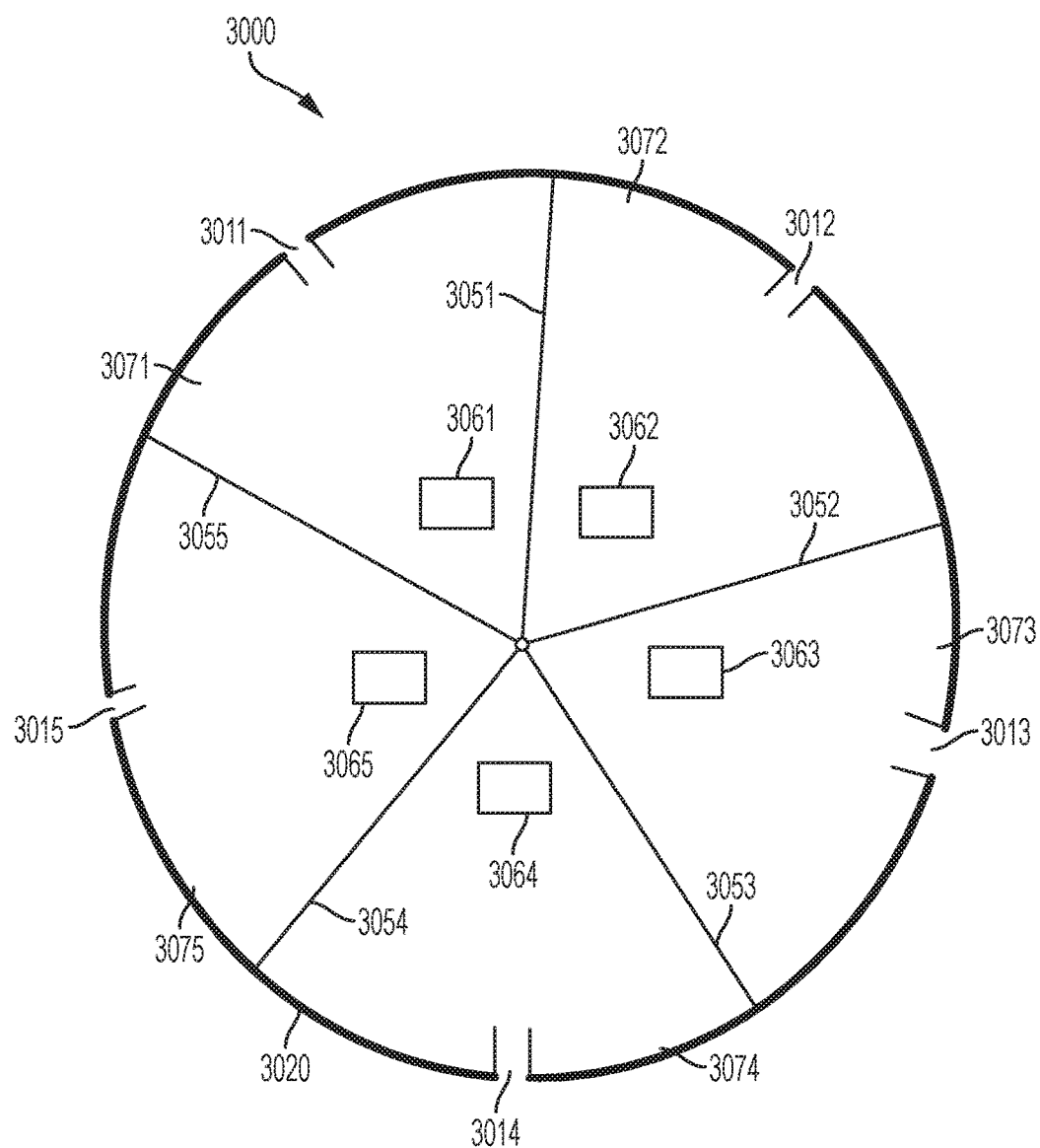

FIGS. 4A, 4B, and 4C illustrate cross-sectional views of the flow velocity and direction measurement system 100 with a varying number of openings, cavities, and pressure sensors according to one or more illustrative aspects described herein.

Referring to FIG. 4A, housing 1020 may contains three openings (e.g., 1011, 1012, and 1013). The opening 1011 may correspond to the cavity 1071 and the pressure sensor 1061. The opening 1012 may correspond to the cavity 1072 and the pressure sensor 1062. The opening 1013 may correspond to the cavity 1073 and the pressure sensor 1063.

Referring to FIG. 4B, housing 2020 may contain four openings (e.g., 2011, 2012, 2013, and 2014). The opening 2011 may correspond to the cavity 2071 and the pressure sensor 2061. The opening 2012 may correspond to the cavity 2072 and the pressure sensor 2062. The opening 2013 may correspond to the cavity 2073 and the pressure sensor 2063. The opening 2014 may correspond to the cavity 2074 and the pressure sensor 2064.

Referring to FIG. 4C, housing 3020 may contain five openings (e.g., 3011, 3012, 3013, 3014, and 3015). The opening 3011 may correspond to the cavity 3071 and the pressure sensor 3061. The opening 3012 may correspond to the cavity 3072 and the pressure sensor 3062. The opening 3013 may correspond to the cavity 3073 and the pressure sensor 3063. The opening 3014 may correspond to the cavity 3074 and the pressure sensor 3064. The opening 3015 may correspond to the cavity 3075 and the pressure sensor 3065.

The housing may also contain a higher or lower number of openings. According to the number of openings, one or more separating walls 1051-1053, 2051-2054, 3051-3055 form respective cavities 1071-1073, 2071-2074, 3071-3075, in which one or more pressure sensors 1061-1063, 2061-2064, 3061-3065 are located. The number of openings, cavities, and pressure sensors may increase and/or decrease the fidelity of the measurement system 100. For example, a measurement system with a large number of openings, cavities, and pressure sensors may have a higher measurement fidelity than a measurement system with a lower number of openings, cavities, and pressure sensors.

Figure 5:
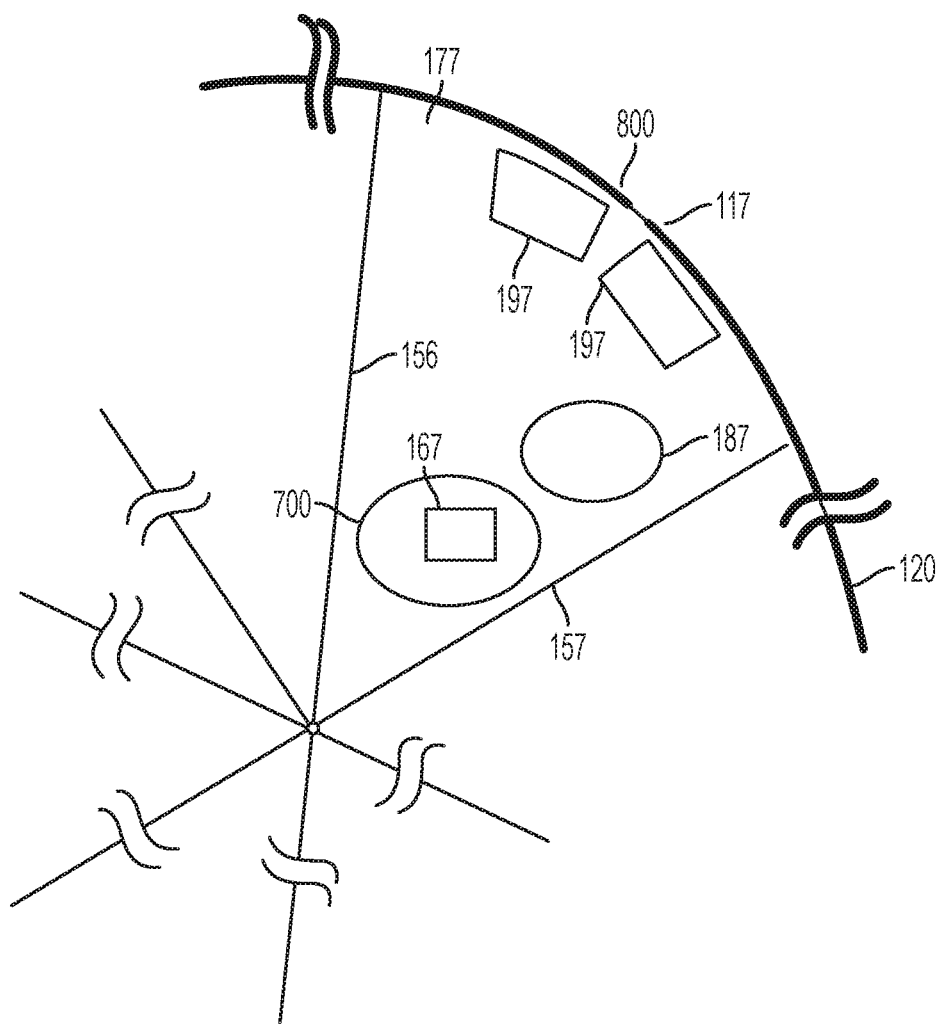
FIG. 5 illustrates a sectional view of the flow velocity and direction measurement system including various features according to one or more illustrative aspects described herein.

FIG. 5 illustrates a sectional view of the flow velocity and direction measurement system 100 including various features according to one or more illustrative aspects described herein. Housing 120 may contain one or more openings 117, one or more separating walls 156, 157 which form cavity 177 in which one or more pressure sensors 167 are located. Heating and/or cooling elements 197 may be placed next to the opening to prevent icing, condensation, or similar effects next to opening 117. Pump 187 may be included inside of cavity 177 to generate over and/or under pressure (e.g., positive and/or negative pressure) over a short duration to free the opening from the accumulation of dust, condensation, icing, particles, or similar debris. Pressure permeable membrane 800 may be placed at opening 117 to protect the cavity 177 and the components stored therein including pressure sensor 167, heating and/or cooling elements 197, pump 187, and the like. As stated above, the components may be located inside of housing 120 in order to be shielded from detrimental environmental effects including, but not limited to, dust, sand, humidity, particles, and/or other factors as discussed herein. Another pressure permeable membrane 700 may be placed directly around pressure sensor 167 to protect pressure sensor 167 from detrimental environmental effects including but not limited to dust, sand, humidity, particles and/or other factors as discussed herein. While described in regard to a particular cavity, the pump 187, heating and/or cooling elements 197, and/or pressure membranes 700 and 800 may be included in each of the cavities of measurement system 100.

FIGS. 6-9 show illustrative additional embodiments of the flow velocity and direction measurement system according to one or more illustrative aspects described herein.

Figure 6:
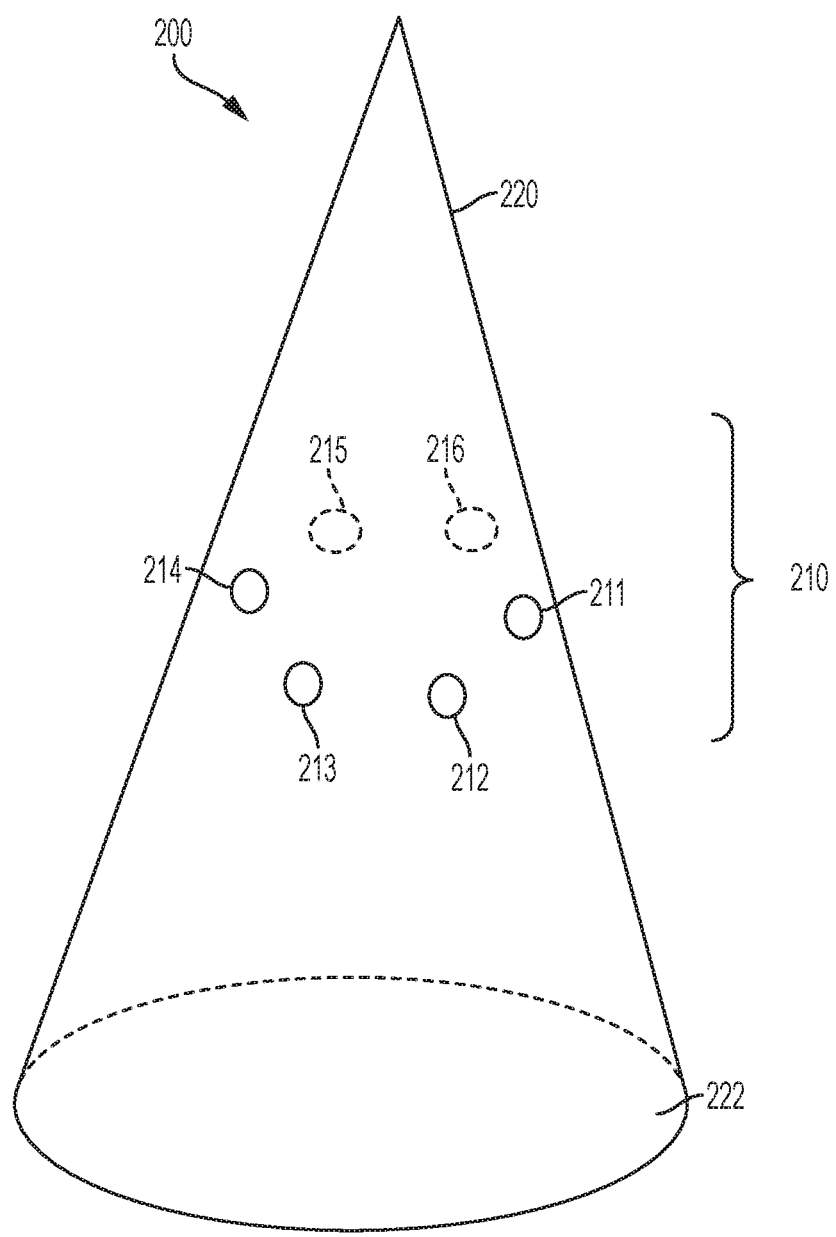
FIGS. 6-9 show illustrative additional embodiments of the flow velocity and direction measurement system according to one or more illustrative aspects described herein.

Referring to FIG. 6, a second illustrative embodiment of a measurement system 200 is shown with housing 220 having a conical shape. Housing 220 may include lower lid 222 and opening area 210 including one or more openings 211-216 at the outside of housing 220.

Figure 7:
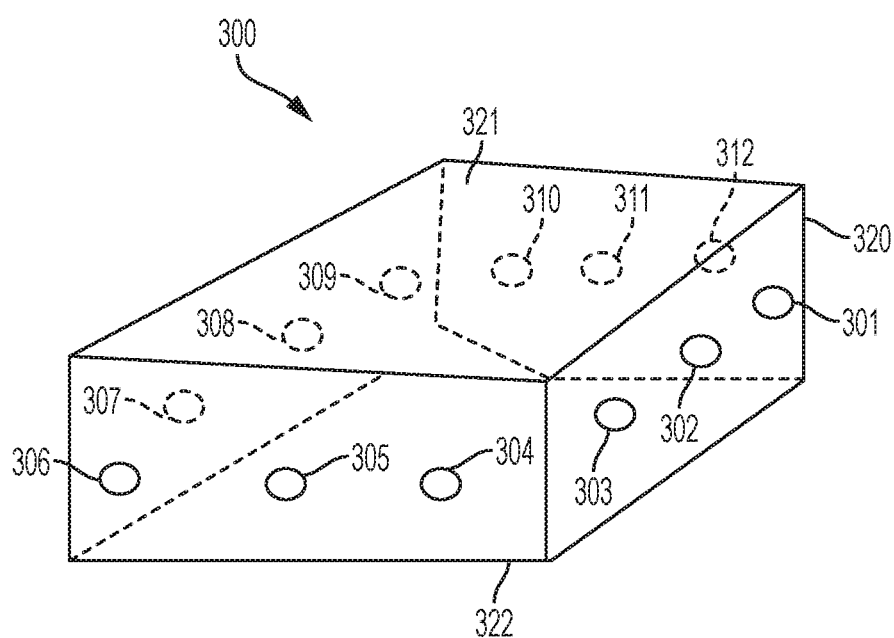

Referring to FIG. 7, a third illustrative embodiment of a measurement system 300 is shown with housing 320 having a rectangular shape. Housing 320 may include upper lid 321, lower lid 322, and one or more openings 301-311 at the outside of housing 320.

Figure 8:
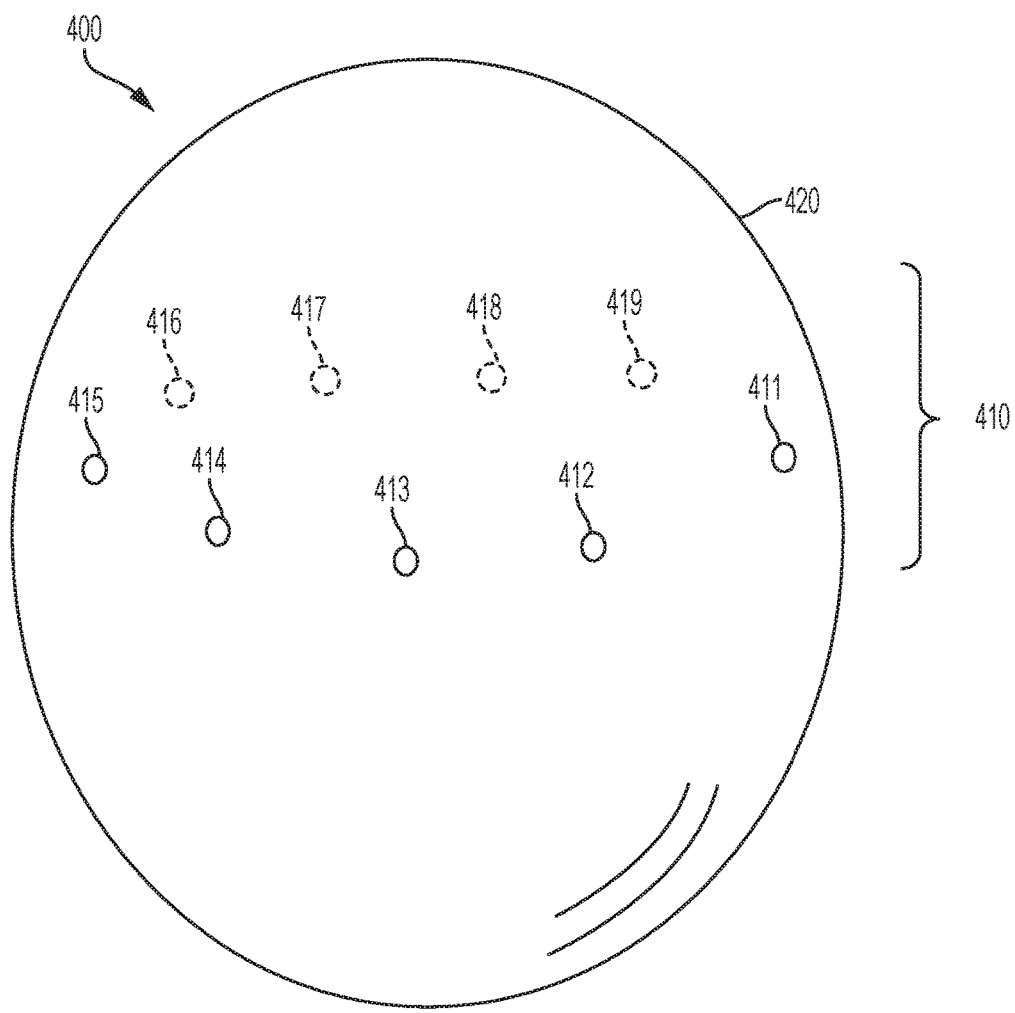

Referring to FIG. 8, a fourth illustrative embodiment of a measurement system 400 is shown with housing 420 having a spherical shape. Housing 420 may include an opening area 410 and one or more openings 411-419 at the outside of the housing 420.

Figure 9:
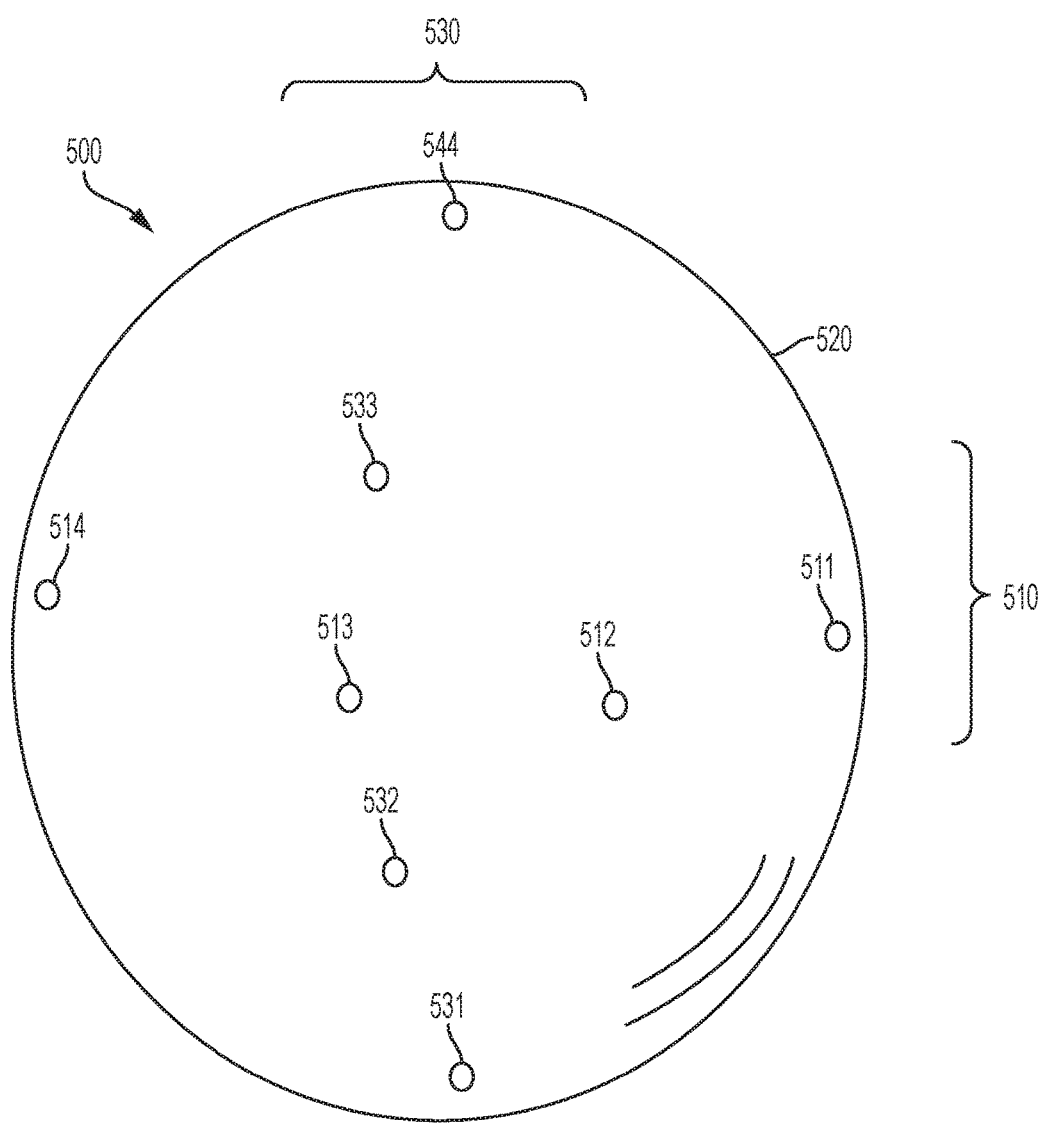

Referring to FIG. 9, a fifth illustrative embodiment of a measurement system 500 is shown with the housing 520 having a spherical shape. Housing 520 may include an opening area 510 with one or more openings 511-514 aligned along a horizontal plane and/or orientated along a particular plane. Additionally, housing 520 may have an opening area 530 with one or more openings 531-534 at the outside of the housing 520 aligned along a vertical plane and/or oriented along a particular plane. The orientation may be such that the direction of a flow of gases and/or liquids may be measured with regards to both their horizontal and vertical flow plane vector (or otherwise orientated plane vectors), i.e. in up to three dimensions.

The described illustrative measurement system is designed to provide accurate and precise measurement of the flow velocity and flow direction of gases and/or liquids in a compact and relatively small housing, resistant against mechanical vibrations and other environmental factors including but not limited to rain, hail, snow, icing, animal interaction, and corrosive substances—and which can be manufactured at low cost.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A measurement system comprising:
   a housing;
   one or more accelerometers;
   a magnetometer;
   a plurality of pressure sensors;
   one or more openings at an outside surface of the housing;
   a plurality of cavities within the housing, wherein each cavity is associated with one or more of the one or more openings, and wherein one or more of the plurality of pressure sensors is within each cavity;
   a processor controlling operation of the measurement system;
   an output interface; and
   memory storing computer-readable instructions, that when executed by the processor, causes the measurement system to:
      read pressure data from pressure sensors enclosed by at least two cavities, based on pressure applied on the housing of the measurement system by a fluid flow at the opening of the one or more openings corresponding to the at least two cavities;
      read accelerometer data, from the one or more accelerometers, corresponding to the fluid flow;
      read magnetometer data, from the magnetometer, corresponding to the fluid flow;
      calculate a velocity and direction of the fluid flow based at least on the accelerometer data, the magnetometer data, and a comparison of the pressure data with calibration data stored in a memory of the measurement system, wherein the calibration data is based on previously recorded data corresponding to a plurality of fluid flows, each having a known direction and velocity; and
      output via the output interface, data corresponding at least to the velocity of the fluid flow.

2. The measurement system of claim 1, wherein the velocity of the fluid flow is calculated at least in part using Bernoulli's equation.

3. The measurement system of claim 1, wherein the housing has a spherical, cylindrical, rectangular, pentagonal, hexagonal, or octagonal shape.

4. The measurement system of claim 1, wherein the openings are aligned along an axis.

5. The measurement system of claim 1, wherein the fluid flow is wind.

6. The measurement system of claim 1, wherein the measurement system contains openings facing in different directions such that a pressure distribution along the outside surface of the housing can be measured at one or more locations along the outside surface of the housing.

7. The measurement system of claim 1, wherein the calibration data further comprises magnetometer calibration data based on data previously recorded by the magnetometer at one or more known orientations of the measurement system, and wherein the calculating the direction and velocity of the fluid flow is further based on a comparison of the magnetometer data to the calibration data.

8. The measurement system of claim 1, wherein the calibration data further comprises accelerometer data based on data previously recorded by the accelerometer at one or more known inclinations of the measurement system, and wherein the calculating the direction and velocity of the fluid flow is further based on a comparison of the accelerometer data to the calibration data.

9. The measurement system of claim 1, wherein the output interface comprises one or more of a visual display, a wireless communications interface, and a data port.

10. The measurement system of claim 1, wherein the one or more accelerometers comprise at least 3 accelerometers, each oriented along a different 3-dimensional axis to detect a 3-dimensional orientation of the measurement system in combination with the magnetometer data.

11. A method for determining a velocity and direction of a fluid flow, comprising:
reading pressure data from one or more pressure sensors enclosed by each of at least two separate cavities within a housing of a fluid flow measurement system, wherein each cavity has at least one pressure sensitive opening to the outside of the housing, such that each pressure sensor reads a pressure applied by a fluid flow on the housing at the opening of the cavity in which each pressure sensor is enclosed;
reading accelerometer data corresponding to the fluid flow, wherein the accelerometer data is read from one or more accelerometers enclosed within the housing;
reading magnetometer data corresponding to the fluid flow, wherein the magnetometer data is read from a magnetometer enclosed within the housing;
calculating a velocity and direction of the fluid flow based at least on the accelerometer data, the magnetometer data, and a comparison of the pressure data with calibration data stored in a memory of the fluid flow measurement system, wherein the calibration data is based on previously recorded data corresponding to a plurality of fluid flows, each of the plurality of fluid flows having a known velocity and direction; and
outputting via an output interface of the fluid flow measurement system, data corresponding at least to the velocity of the fluid flow.

12. The method of claim 11, wherein the velocity of the fluid flow is calculated at least in part using Bernoulli's equation.

13. The method of claim 11, wherein the housing has a spherical, cylindrical, rectangular, pentagonal, hexagonal, or octagonal shape.

14. The method of claim 11, wherein the openings are aligned along an axis of the housing.

15. The method of claim 11, wherein the openings face different directions equally distributed around the housing.

16. The method of claim 11, wherein the calibration data further comprises magnetometer calibration data based on data previously recorded by the magnetometer at one or more known orientations of the fluid flow measurement system, and wherein the calculating the direction and velocity of the fluid flow is further based on a comparison of the magnetometer data to the calibration data.

17. The method of claim 11, wherein the calibration data further comprises accelerometer data based on data previously recorded by the accelerometer at one or more known inclinations of the fluid flow measurement system, and wherein the calculating the direction and velocity of the fluid flow is further based on a comparison of the accelerometer data to the calibration data.

18. The method of claim 11, wherein the output interface comprises one or more of a visual display, a wireless communications interface, and a data port.

19. The method of claim 11, wherein the one or more accelerometers comprise at least 3 accelerometers, each oriented along a different axis of an X,Y,Z axis to detect a 3-dimensional orientation of the measurement system in combination with the magnetometer data.

20. The method of claim 11, wherein the fluid flow is wind.

* * * * *